(12) United States Patent
Rembach (10) Patent No.: US 10,938,215 B1
(45) Date of Patent: Mar. 2, 2021

(54) POWER BOOSTER ENERGY STORAGE SYSTEM (ESS) WITH SKIMMING DEVICE FOR OPERATING A VESSEL

(71) Applicant: Thrustmaster of Texas, Inc., Houston, TX (US)

(72) Inventor: Paul F. Rembach, Cypress, TX (US)

(73) Assignee: THRUSTMASTER OF TEXAS, INC., Houston, TX (US)

( * ) Notice: Subject to any disclaimer, the term of this patent is extended or adjusted under 35 U.S.C. 154(b) by 0 days.

(21) Appl. No.: 16/788,869

(22) Filed: Feb. 12, 2020

Related U.S. Application Data (60) Provisional application No. 62/940,068, filed on Nov. 25, 2019.

(51) Int. Cl.
*H02J 3/38* (2006.01)
*G05B 19/042* (2006.01)
*H02J 3/32* (2006.01)

(52) U.S. Cl.
CPC ............ *H02J 3/381* (2013.01); *G05B 19/042* (2013.01); *H02J 3/32* (2013.01); *G05B 2219/2639* (2013.01)

(58) Field of Classification Search
CPC ....................................... H02J 3/382
USPC .......................................... 700/287
See application file for complete search history.

(56) References Cited

U.S. PATENT DOCUMENTS

| | | | |
|---|---|---|---|
| 7,980,905 B2 | 7/2011 | Rembach et al. | |
| 8,197,291 B2 | 6/2012 | Rembach et al. | |
| 8,278,879 B2 * | 10/2012 | Kumar | B63H 21/20 320/128 |
| 8,554,398 B2 | 10/2013 | Rembach et al. | |
| 10,399,654 B2 | 9/2019 | Rembach | |
| 2009/0176417 A1 * | 7/2009 | Rembach | B63H 21/17 440/6 |
| 2009/0206677 A1 * | 8/2009 | Kulpin | H03K 3/57 307/113 |
| 2011/0080040 A1 * | 4/2011 | Kumar | H02P 9/307 307/9.1 |
| 2012/0071043 A1 * | 3/2012 | Rembach | B63J 3/02 440/6 |
| 2012/0071044 A1 * | 3/2012 | Rembach | B63H 21/21 440/6 |
| 2012/0109450 A1 * | 5/2012 | Rembach | B63J 3/04 701/36 |
| 2014/0197768 A1 * | 7/2014 | Haugen | H02J 9/04 318/442 |
| 2017/0373502 A1 * | 12/2017 | Gjerpe | H02J 4/00 |

(Continued)

*Primary Examiner* — Suresh Suryawanshi
(74) *Attorney, Agent, or Firm* — Nolte Lackenbach Siegel (57) ABSTRACT

A plurality of generators provide power to loads, such as loads on a vessel. A skimming device receives and stores skimmed power from the plurality of generators. A battery bank receives the stored skimmed power from the skimming device and provides the stored skimmed power to the loads. A controller controls receipt and storage of the skimmed power by the skimming device and monitors a level of the stored skimmed power in the skimming device. The controller controls the transfer of the stored skimmed power from the skimming device to the battery bank and provisioning of the stored skimmed power from the battery bank to the loads based on the level of the stored skimmed power in the skimming device.

20 Claims, 10 Drawing Sheets

(56) References Cited

U.S. PATENT DOCUMENTS

2019/0023369 A1\* 1/2019 Gjerpe .................. B63H 21/17
2019/0389552 A1\* 12/2019 Rembach .................. B63J 3/04

\* cited by examiner

POWER BOOSTER ENERGY STORAGE SYSTEM (ESS) WITH SKIMMING DEVICE FOR OPERATING A VESSEL

CROSS-REFERENCE TO RELATED APPLICATION

This application claims priority to U.S. Provisional Patent Application No. 62/940,068 filed Nov. 25, 2019, the contents of which are incorporated herein by reference.

BACKGROUND

An offshore service vessel (OSV), such as a vessel delivering bulk loads to offshore production and drilling fleets, consumes a large amount of diesel fuel. There are many reasons for the large quantity of fuel consumption. A primary reason is the distance the OSV travels to the offshore location. The distance can commonly be 300 nautical miles or more. With a 300 nautical mile trip, making a round trip back to the port of origin requires a minimum of 600 nautical miles. In addition to the fuel consumed during the 600 nautical mile round trip, fuel is consumed during the hours staying on location offloading and accepting any loads needing to be transported to the shore base.

At times, an OSV is additionally tasked with staying on station after arrival. When loitering and the weather is favorable, the OSV stays within the general area operating in a dynamic positioning (DP) mode and has minimal loading on the local vessel power generation system. Therefore, it is advantageous if the OSV can use stored energy instead of the fuel consuming diesel engines when loitering.

With the recent acceptance within the marine market for power systems with a stored energy reserve onboard the vessel, many manufactures have introduced various stored energy solutions into the market. One approach uses an Energy Storage System (ESS) to store power on a vessel and provides the power to loads while the vessel is loitering or otherwise not in transit mode.

However, there exists a need for an efficient system for storing power and providing the stored power to loads in a manner that improves the reduction of fuel consumed by the generators.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

According to illustrative examples, a skimming device is added to a power booster system of a vessel to provide power generator system fuel savings. The skimming device is used to skim and store reactive power (low power factor) from generators during an extended transit mode and provide the stored skimmed power to a battery bank (also referred to as the ESS) of the booster system, such that the battery bank is able to provide power during a loitering mode. The example systems, devices, and methods described herein are particularly useful for providing power to loads on vessels with extended duty cycles, such as OSVs. The OSVs may include, for example, tugboats, ferries, etc.

To understand the advantages of adding a skimming device to a power booster system of a vessel, it is helpful to first explain a power generator system and a power booster.

Figure 1A:
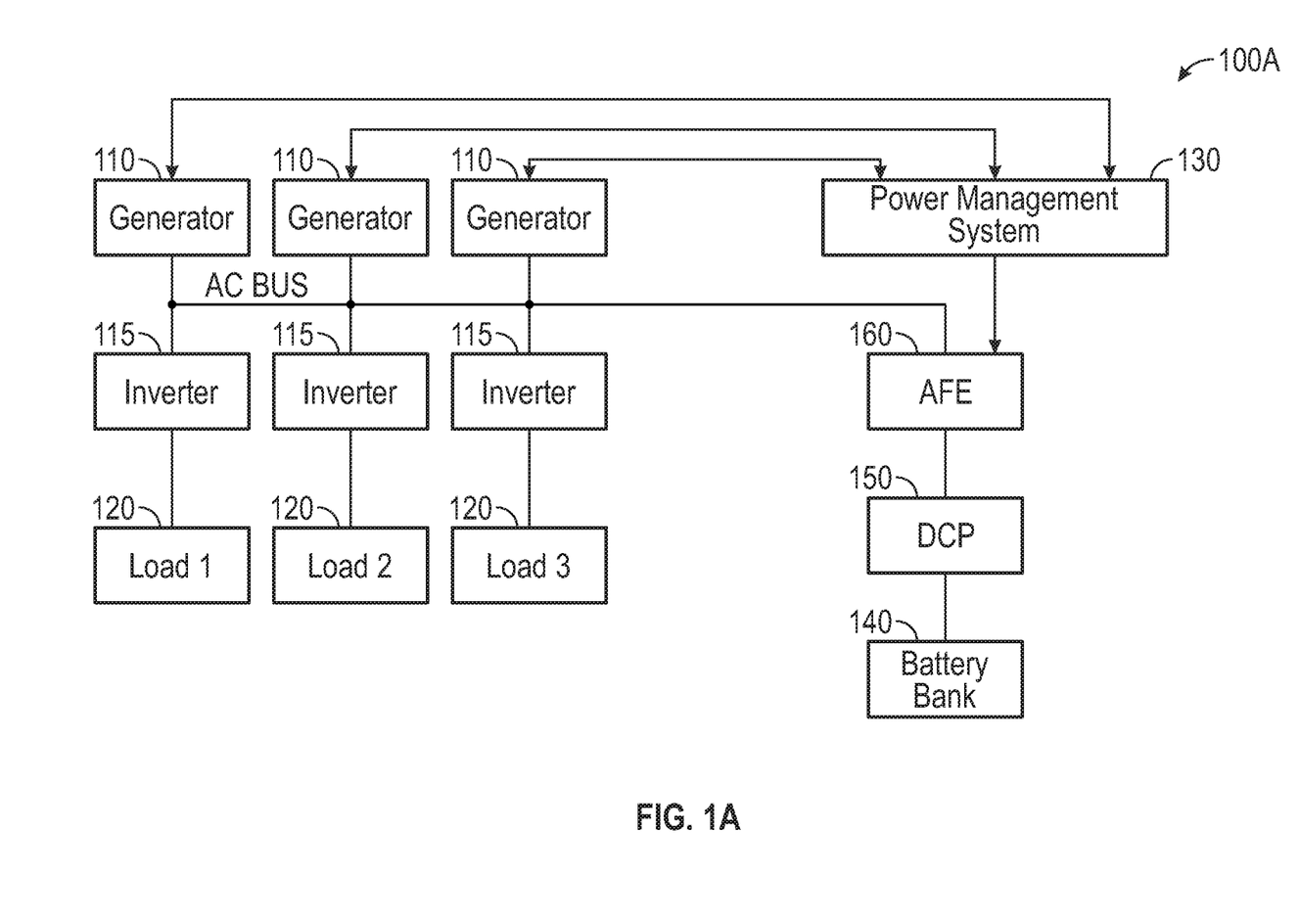
FIG. 1A illustrates a system including a power booster according to an example of the present disclosure.
Figure 1B:
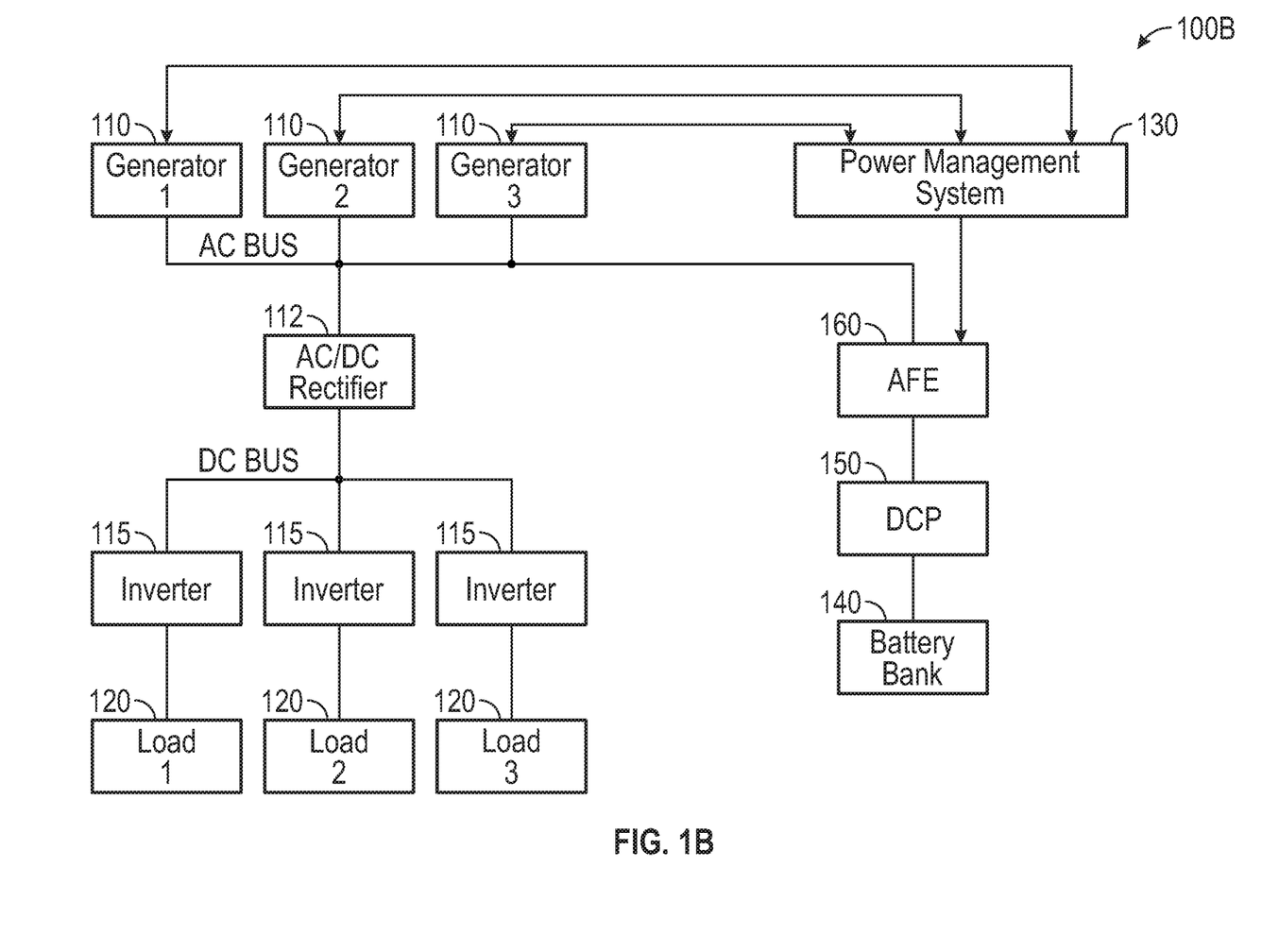
FIG. 1B illustrates a system including a power booster according to another example of the present disclosure.

FIGS. 1A and 1B illustrate systems 100A and 100B, respectively, including power booster components that store and supply skimmed power according to examples of the present disclosure. The systems 100A and 100B include generators 110 connected via an AC bus to generate AC power, inverters 115 to convert the AC power to DC power, and loads 120 to which the power is supplied. On an OSV, the loads 120 may include, for example, thrusters.

The systems 100A is similar to the system 100B except that the system 100A does not use a common DC bus. The system 100B includes a common DC bus connected to the inverters 115. The system 100B also includes an AC/DC rectifier 112 between the AC bus connecting the generators 110 and the common DC bus.

The systems 100A and 100B also include a power management system 130 that turns the generators 110 on and off and power booster components including a battery bank 140 (also referred to as an ESS), a DC/DC Power Converter (DCP) 150, and an Active Front End (AFE) 160. The power booster components are explained in further detail below.

To understand how fuel of a power generator system is saved by adding a skimming device to a system including power booster components, such as that shown in the system 100A and 100B, it is helpful to have a basic knowledge of how a power generation system works. A power generator generally has two main hardware components: the prime mover (typically a diesel engine) and the AC alternator. The diesel engine and the AC alternator are physically coupled together with the diesel engine turning the alternator. Each component has a specific task to perform.

A diesel engine's function is to turn the alternator at a specific constant rounds per minute (RPM). Diesel engines are rated in horse power. As those skilled in the art would appreciate, there are 746 watts in 1 horse power. Since most diesel engines are rated in thousands of horse power, the equivalent watts are typically expressed in thousands, with 1 kilowatt (1 kW) representing 1000 watts.

An alternator's function is to maintain a constant voltage output. Power from the generator is rated in Volts and Amps or VA. Thousands of VA are expressed as kVA where 1 kVA=1000 VA's. Vessel loads, such as thrusters, are typically inductive (reactive), requiring magnetizing current. This results in recirculation of Amps between the load and the generator, with the Amps producing no actual work. This is called reactive current and expressed as VARs. (VoltsAmpsReactive). Thousands of VARs are expressed as kVARs where 1 kVAR=1000 VARs.

The RPM of a diesel engine turning the alternator sets the frequency of the generator power output. The faster the generator's armature poles spin, the higher the frequency.

A generator supplying power to the vessel loads will experience a resistance to the spinning of its armature as the load performs actual work. The more work performed, the more resistive torque applied to the generator armature. The work is measured in kW. As torque is applied to the generator armature resisting rotation, the diesel engine coupled to it will slow. As described above the diesel engine's task is to maintain a constant RPM. The resulting speed error triggers a need for an engine kW controller to deliver more fuel and apply a matching torque to counteract the torque causing the speed error. The engine is able to counteract the torque trying to slow it by thematically oxidizing an equivalent amount of the energy stored within (plus additional volume for losses) the diesel fuel, and the engine converts the vertical forces into rotating torque.

A diesel engine kW controller must have feedback of the kW output of the generation system for smooth linear control of the engine's response to counter active loads. This is accomplished by monitoring the individual components of the generator output power and application of standard math to the feedback values.

As those skilled in the art will appreciate, for a three phase power generation system, kW may be expressed as:

$$kW = (AC\ Volts \times AC\ Amps \times \sqrt{3} \times PF)/1000 \quad (1)$$

where PF is the power factor. The PF is defined as the angular differential of the voltage and current waveforms originating in the generator. When the waveforms are in unity together, the PF value is 1.0. A favorable power factor is in the 0.96 to 98 range. In a system in which loads are inductive, such as a thruster, the farther apart the voltage and current waveforms, the lower the PF is.

As an example, to illustrate the effect of a PF on kW, assume an OSV has a 690 Volt power generator system with a 0.7 PF load requiring 1000 Amps. The kW required from the diesel engine (without losses) can be expressed as:

$$690 \times 1000 \times 1.732 \times 0.7 = 837.5\ kW \quad (2)$$

Now, assume the load has less waveform differential, resulting a better PF of 0.98. The kW required from the diesel engine in this case can be expressed as:

$$690 \times 1000 \times 1.732 \times 0.98 = 1171.84\ kW \quad (3)$$

With the example above, it can be seen that, with the same Volts and Amps, a change in the applied load PF has a great effect on the kW value of the work being performed by the power generator system. Thus, a higher PF with the same amount of Amps results in more fuel needed to counteract the resulting torque applied to the generator armature trying to slow the diesel engine.

As can be seen from the foregoing examples, a low power factor is an event to be avoided in most power generator systems. A low PF often creates the situation where the generators are at or near the maximum amperage output while the diesel engines are nowhere near their maximum KW (HP) output. Another engine/generator must be placed online to recirculate the nonproductive magnetizing current not producing actual work. This results in more diesel engines running at low load. Diesel engines running at low loads are referred to as slobbering.

Having explained the importance of a PF in a power generation system, details of the power booster components shown in FIGS. 1A and 1B will now be provided. Referring again to FIGS. 1A and 1B, the AFE 160 that is connected to the generators via the AC bus and is capable of automatically synchronizing to the generators via the AC bus. The AFE 160, which is considered a voltage source power device, is bi-directional. That is, the AFE 160 can store skimmed power received from the generators 110 in the battery bank 140. The AFE 160 can also inject the skimmed power stored in the battery bank 140 to reduce kW loading on the generators 110, eliminating the need to place another generator online.

The DCP 150, which is located between the AFE 160 and the battery bank 140, is similar to a DC transformer and is bi-directionally controllable with regard to current flow. As the battery bank 140 charge depletes, the voltage level of the stored energy cells with the battery back 140 gets lower and lower. The DCP 150 adjusts this voltage to match that of the bus connected to the AFE 160. When charging the battery bank, the DCP 150 will transfer power into the battery bank 140 by adjusting the voltage of the battery bank to the most desirable level, which may be higher or lower than that of the bus connected to the output of the AFE 160.

Power may be provided from the battery bank 140 via the AFE 160 to the loads, e.g., when the vessel is loitering. When the vessel is in transit, the power booster components perform "peak shaving", delivering just enough power from the battery bank 140 to the generators 110 so that another generator does not have to be put online.

As the power booster components perform peak shaving, the State of Charge (SoC) of the battery bank 140 is depleted, and the battery bank 140 will need to be refreshed (recharged) at some point. The battery bank 140 can take a lot of Amps at a high voltage to refresh the cells. The power to refresh the battery bank 140 originates at the generators 110 and is transferred through the AFE 160 to the battery bank 140. This requires consumption of the vessel's bunkered fuel supply to refresh the energy stored in the battery bank 140. Thus, even though power booster components may reduce the fuel needed to power the loads during transit, a lot of fuel is needed to refresh the battery bank 140.

To calculate the fuel needed to during a standard power booster charge refresh cycle, some assumptions must first be made as to the actual size and gallons per hour of the diesel engine, and an easy round number is used for the amperage needed to charge the battery bank 140. The numbers used for the assumptions in the example below are estimated values to provide ease of understanding and clarity.

Assuming that the kW of diesel engines=500 kW, and gallons consumed per hour (GPH) at 100% load=50, there are 50 GPH/500 kW=0.1 gallon per kW per hour. Assume that the charge current=100 Amps, and the PF of the AFE=0.98. In addition, estimate that full refresh of the battery bank takes 10 hours at 100 continuous Amps. Based on these assumptions, the kW load placed upon the power generating system can be estimated and used as a basis to calculate the gallons of fuel consumed to refresh the battery bank 140.

It should be noted that the GPH of diesel engine fuel consumption is not linear. That is to say if 100% loaded at 500 kW and using 50 GPH, the engine will not use 25 GPH when loaded to 250 kW. However, to simplify the calculation, the GPH fuels used is assumed to follow the kWh in a linear fashion.

Using the power factor example above in Equation 2, the kW required from the generators can be expressed as:

$$690 \times 100 \times 1.732 \times 0.98 = 117.117 \text{ kW} \quad (4)$$

The GPH can be expressed as:

$$117.117 \times 0.1 = 11.711 \text{ GPH} \quad (5)$$

The total GPH used is then:

$$11.711 \text{ GPH} \times 10 \text{ hours} = 117.711 \text{ gallons}$$

That is, 117.711 gallons are consumed during to refresh the battery bank 140.

From these calculations, it can be seen that charging a battery bank that is with the AFE 160, which is a voltage source power electronic device, combined with the fact batteries are a resistive load and thus require a "near unity" PF, places a high kW load on the power generation system, with more fuel needed for the diesel engines to remain at the constant speed. When an OSV is in transit, the loading of the thrusters is fairly stable, and it is beneficial for the efficiency of power generation system to have voltage source inverter loads operating at a near unity power factor. Typically, an engineer will want to keep the diesel engines loaded around the 80% kW level achieving optimal fuel efficiency. Operating in the optimal fuel efficiency range for the diesel engines does not leave much of a spinning reserve to charge the battery bank 140 while in transit.

According to illustrative examples, the PF of a load may be lowered while maintaining a constant current and reducing the kW load on the diesel engines by adding a skimming device that includes charging capacitors or "ultracapacitors".

Figure 2A:
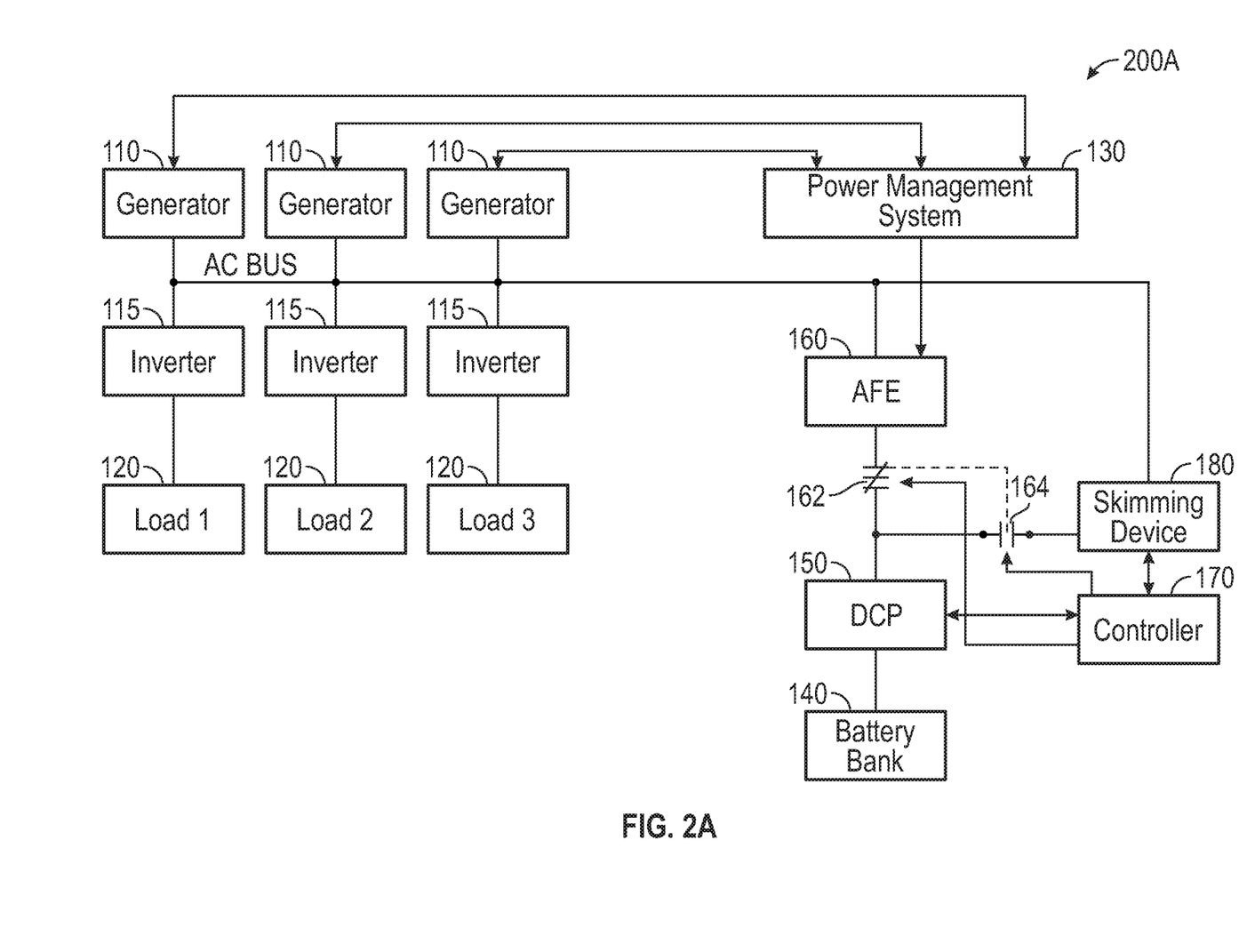
FIGS. 2A and 2B illustrate systems operating in an export power mode according to examples of the present disclosure.
Figure 2B:
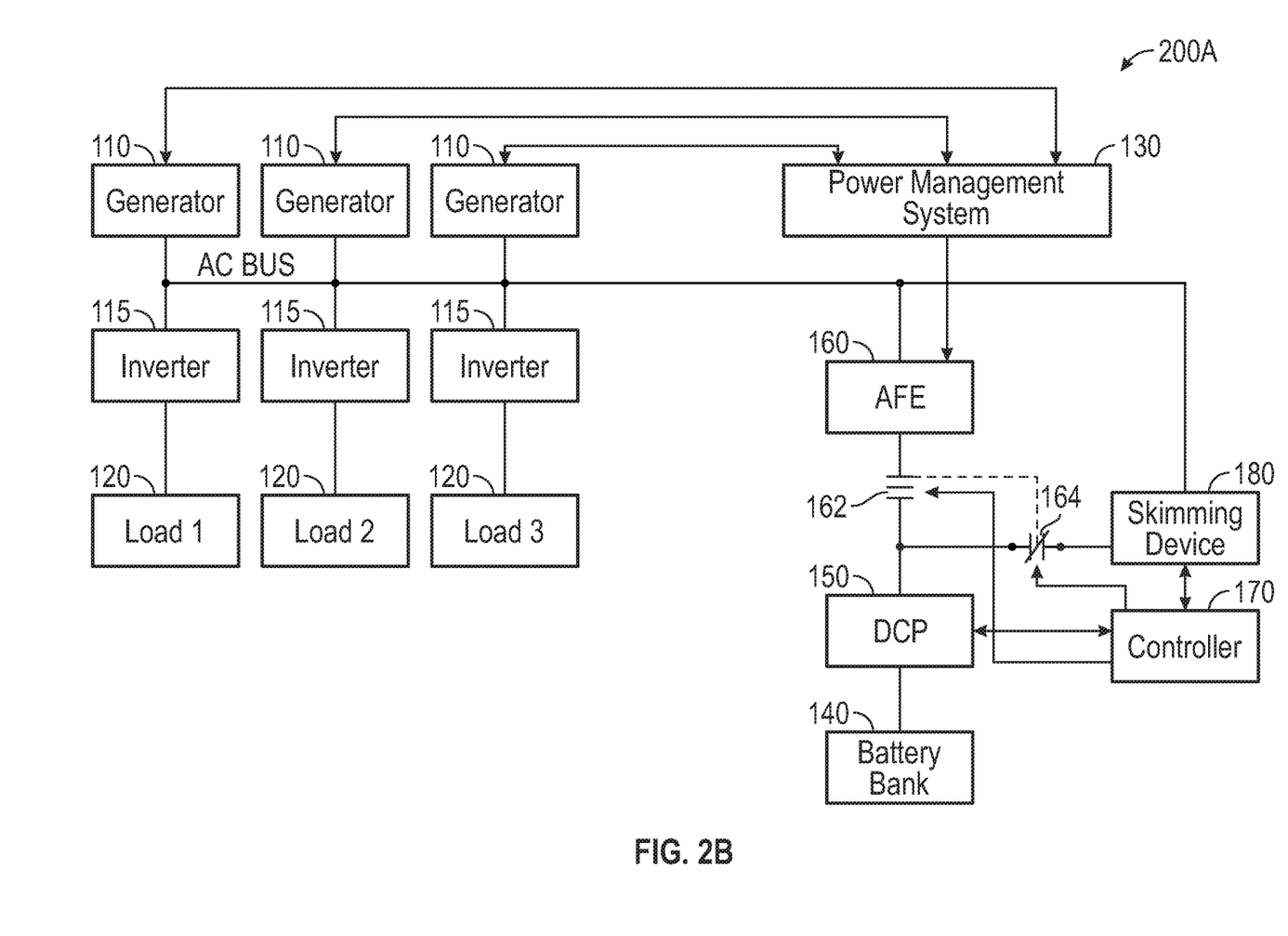
Figure 2C:
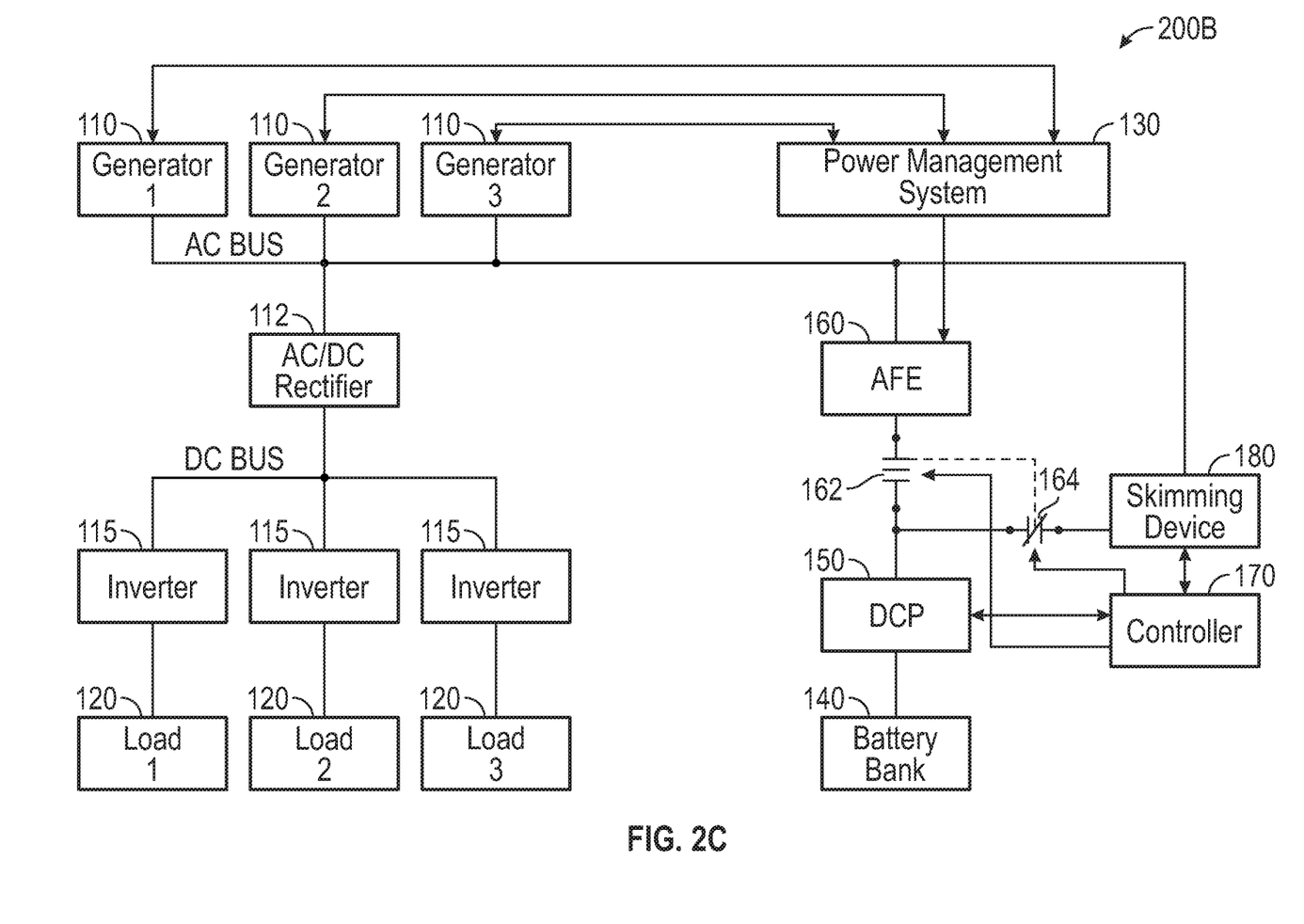
FIGS. 2C and 2D illustrate systems operating in a refresh power mode according to examples of the present disclosure.
Figure 2D:
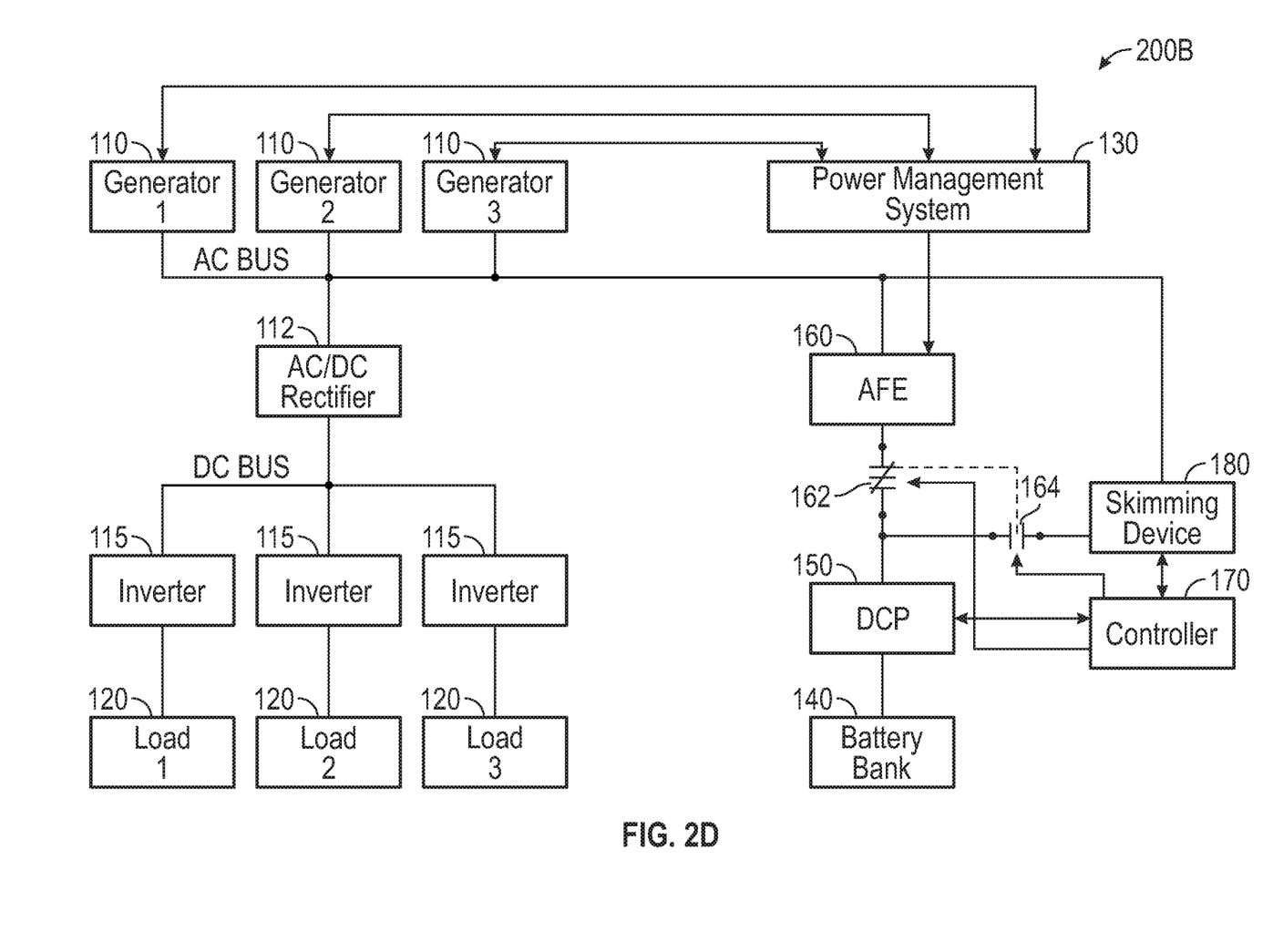

Examples of systems including skimming devices are shown in FIGS. 2A-2D. FIGS. 2A and 2B illustrates systems operating in an export power mode according to examples of the present disclosure. FIGS. 2C and 2D illustrate systems operating in a refresh power mode according to examples of the present disclosure. Details of the export power mode and the refresh power mode are provided below.

The systems 200A and 200B are similar to the systems 100A and 100B in that they include generators 110 connected via an AC bus to generate AC power, inverters 115 to convert the AC power to DC power, and loads 120 to which the power is supplied. The systems 200A and 200B also include power booster components including a battery bank 140, a DCP 150, and an AFE 160 which is connected via a bus to the generators 110.

The system 200A shown in FIGS. 2A and 2B and the system 200B shown in FIGS. 2C and 2D are similar except that the system 200A does not use a common DC bus. The system 200B includes a common DC bus connected to the inverters 115. The system 200B also includes an AC/DC rectifier 112 between the AC bus connecting the generators 110 and the common DC bus.

The systems 200A and 200B also include a power management system 130 that turns the generators 110 on and off and controls the AFE 160. The systems 200A and 200B further including include first and second switches 162 and 164, a skimming device 180 connected to the generators 110 via a bus, and a controller 170.

The controller 170 controls operation of the first and second switches 162 and 164 to allow the transfer of power from the skimming device 180 to the battery bank 140 based on a level of stored skimmed energy of the skimming device 180. The first and second switches 162 and 164 are interlocked together to ensure that only one can close at a time. Operation of the controller 170 and the first and second switches 162 and 164 is described in in further detail below.

Although shown as a separate device, the controller 170 may be included in the skimming device 180. Also, the controller may be in communication with the power management system 130.

Figure 3:
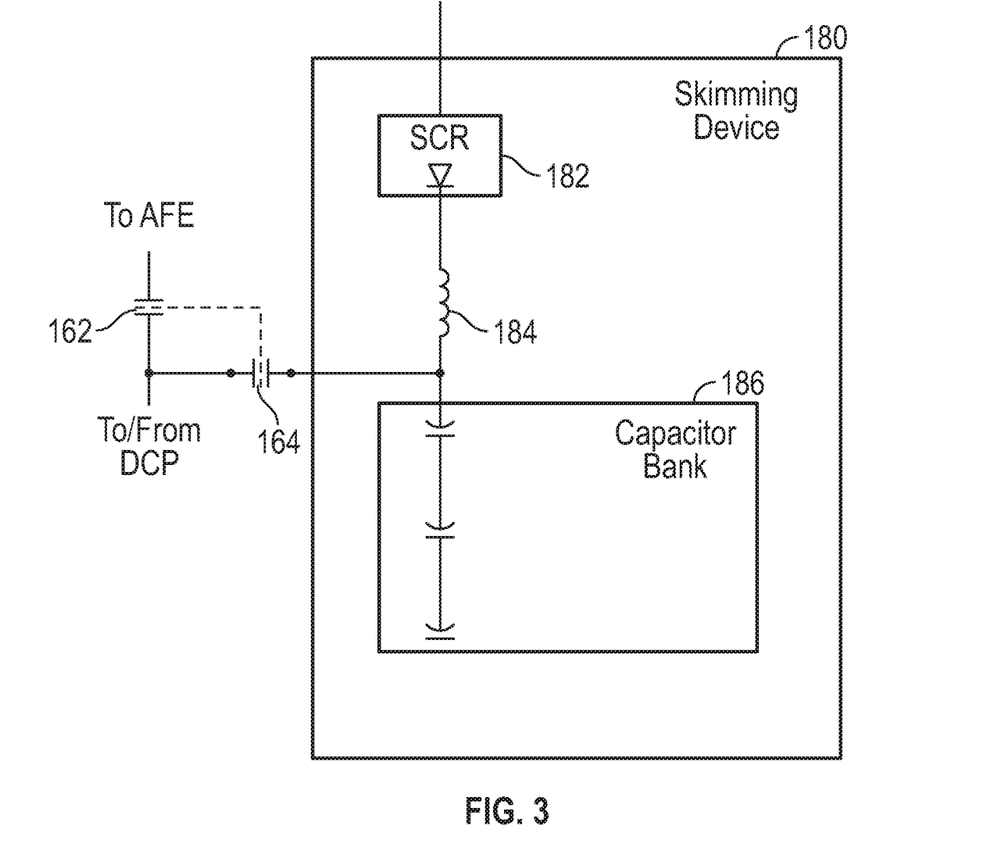
FIG. 3 illustrates details of a skimming device according to one or more examples of the present disclosure.

Details of the skimming device 180 are illustrated in FIG. 3. As shown in FIG. 3, the skimming device 180 includes a Silicon Controlled Rectifier (SCR) 182, a smoothing inductor 184, and a capacitor bank 186. The SCR 182 receives a constant current from the generators 110 that is smoothed by the smoothing inductor 184. The constant smoothed current is used to charge the capacitor bank 186 of ultracapacitors to store the skimmed power.

The SCR 182 is a single quadrature unit and supplies uni-directional current. Accordingly, the charging of the battery bank 140 by the skimming device 180 is accomplished in two phases. Phase one, which may be referred to as an export power mode, is represented in FIGS. 2A and 2C. Phase two, which may be referred to as a refresh power mode, is represented in FIGS. 2B and 2D.

Referring to FIGS. 2A and 2C, the first switch 162 and the second switch 164 are shown in the normal state of operation, with the first switch 162 closed and the second switch 164 open. In this phase, the skimming device 180 is isolated from the power booster components including the AFE 160, the DCP 150, and the battery bank 140. During phase one, the first switch 162 is closed, connecting the battery bank 140 to the AFE 160 to export the skimmed power stored in the battery bank 140 to the loads for peak shaving.

The controller 170 monitors the stored skimmed power level of the skimming device 180 by monitoring the voltage level of the capacitor bank 186. When the stored skimmed power level of the skimming device 180 reaches a predetermined maximum threshold, e.g., 50 Volts with a constant amperage, the controller 170 initiates phase two, causing transfer of the stored skimmed power from the skimming device 180 to the battery bank 140.

During phase two, which is depicted in FIGS. 2C and 2D, the skimmed power stored in the capacitor bank 186 of the skimming device 180 is transferred to the battery bank 140. The capacitor bank 186 is capable of transferring almost 99% of the stored power. When phase two is initiated, the power management system 130 disables the AFE 160, such that energy is not exported from the power booster components. The controller 170 may communicate with the power management system 130 to cause the power management system to disable the AFE 160. In addition, the controller 170 switches the SCR 182 off in this phase such that no current is delivered to the capacitor bank 186.

During phase two, the DCP 150 is set to 0 Volts on the DC bus side that is connected to the AFE 160. The controller 170 sends a command to open the first switch 162. When the first switch 162 is confirmed opened, and the DC bus voltage is under 10 Volts, the controller 170 sends a command to close the second switch 164. The controller 170 also instructs the DCP 150 to operate in a refresh mode and adapt to the new range of operating DC voltage levels on the input DC bus side of the DCP 150. The controller 170 instructs the DCP 150 to begin transfer of stored skimmed power from the capacitor bank 186 of the skimming device 180 to the battery bank 140. As the voltage level of the capacitor bank 186 reduces with the SoC, the DCP 150 adapts and maintains a constant level of power transfer between the capacitor bank 186 and the battery bank 140 by allowing more current into the battery bank 140.

The controller 170 continues to monitor the stored skimmed power level of the skimming device 180 by monitoring the voltage level of the capacitor bank 186. Once the level of the stored skimmed power reaches a predetermined minimum threshold, e.g., a minimum voltage level of 5 Volts with a constant amperage, the controller 170 causes the first switch 162 to open and the second switch 164 to close, and the power management system 130 reenables the AFE 160. Thus, the mode of operation is reset to an export mode of operation and the stored skimmed power is provided from the battery bank 140 to the loads 120.

Figure 4:
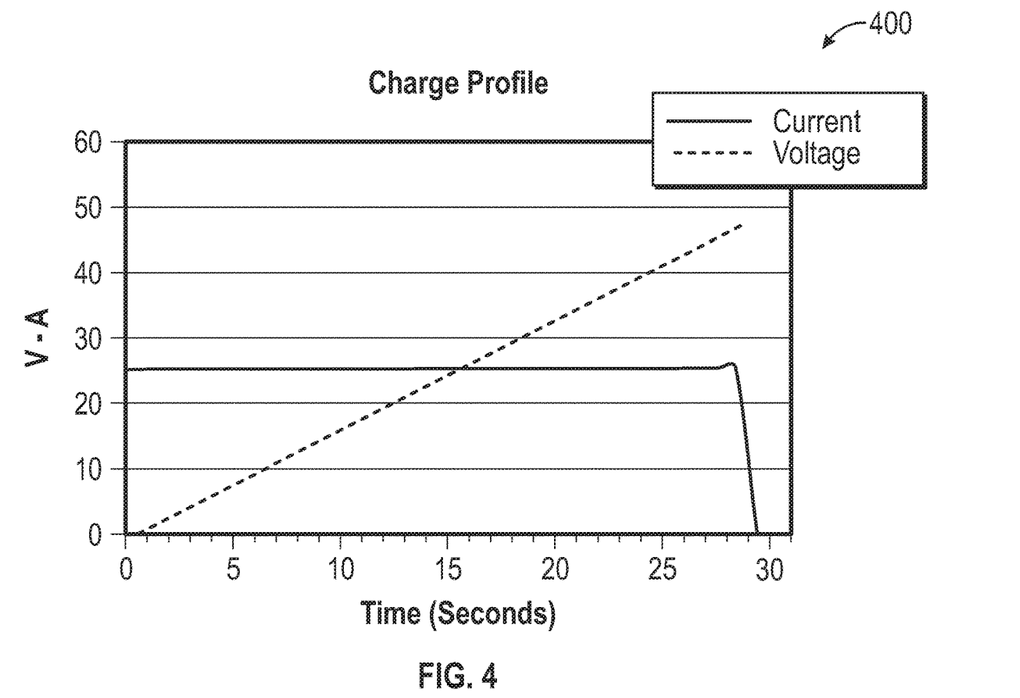
FIG. 4 illustrates an example of a charge profile of an ultracapacitor according to one or more examples of the present disclosure.

The ultracapacitors included in the capacitor bank 186 have a favorable charging profile, as depicted in FIG. 4. When supplied with a constant current, the voltage of the ultracapacitors will rise at a linear rate until full.

Figure 5:
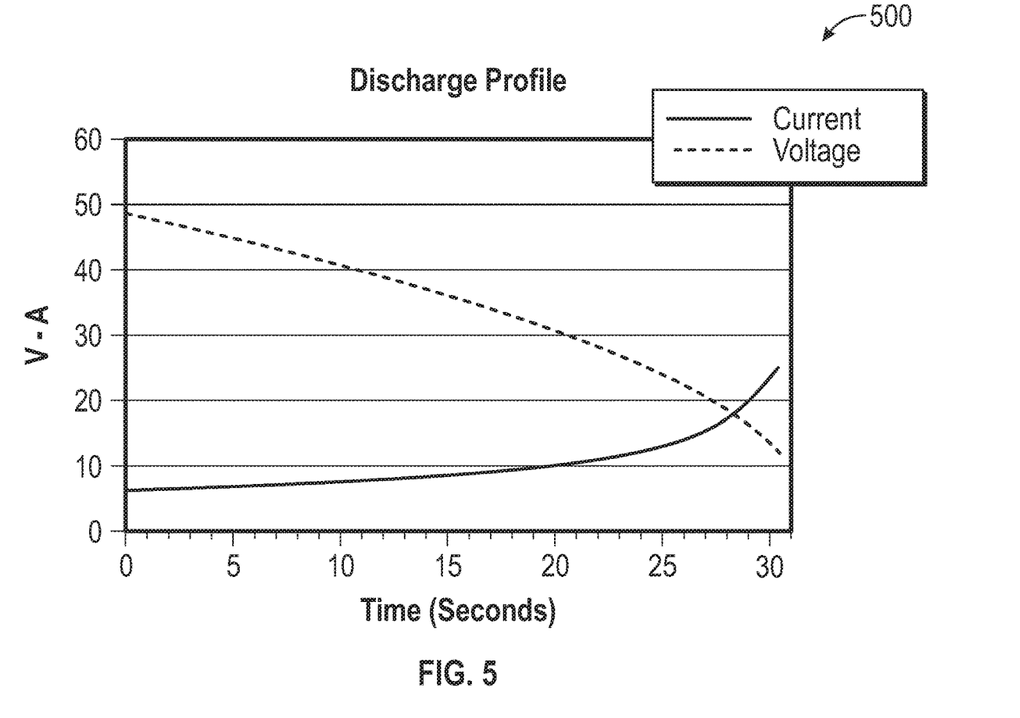
FIG. 5 illustrates an example of a discharge profile of an ultracapacitor according to one or more examples of the present disclosure.

It should be noted that the voltage reduces with the state of charge. This is evident from FIG. 5 which shows the discharge characteristic of the ultracap. Note the decrease in voltage as the SoC decreases and the current increases slightly as the SoC decreases.

According to illustrative examples, using the skimming device 180 including the SCR 182, which is a current source power electronic device that has a low PF, instead of the AFE 160, which operates near unity, results in a reduction of the kW required from the generators 110. A reduction in kW means a reduction in torque from the diesel engines. The lower the torque, the lower the amount of fuel used. Accordingly, less fuel is needed to charge the ultracapacitors as a result of the reduced kW.

According to illustrative examples, the process of charging the capacitor bank 186 only requires a constant current. As long as there is sufficient spinning reserve of amperage available from the online generators to apply the constant current without the need to place another generator online, the lower power factor becomes an advantage during the charging mode while the vessel is either in transit or loitering. The transit mode may offer the best opportunity to charge, as the amount of charging current may be controlled with the SCR 182.

To compare the fuel consumed using the skimming device 180 to that consumed using the battery bank 140, it is first useful to determine the PF of the skimming device 180. The PF of the skimming device 180 may be determined based on the charge profile shown in FIG. 4.

To calculatable the PF, using the charge profile shown in FIG. 4, assume that three points of PF reference over time, i.e., 0.01, 0.5 and 0.98. Adding these three points of reference and dividing the sum yields an average PF through the charge cycle of 0.49.

Assume, again, that the kW of diesel engines=500 kW, gallons consumed per hour (GPH) at 100% load=50, and there are 50 GPH/500 kW=0.1 gallon per KW per hour. Assume also that the charge current=100 Amps, and estimate that the full refresh of the battery bank takes 10 hours at 100 continuous Amps. Also assume, based on the calculations above, that the average PF of the skimming device is 0.49.

Using the power factor example above in Equation 2, the kW required from the generators 110 can be expressed as:

$$690 \times 100 \times 1.732 \times 0.49 = 58.558 \text{ kW} \quad (6)$$

The GPH can be expressed as:

$$58.558 \times 0.1 = 5.885 \text{ GPH} \quad (7)$$

The total GPH used is then:

$$5.855 \text{ GPH} \times 10 \text{ hours} = 58.55 \text{ gallons} \quad (8)$$

That is, 58.55 gallons are consumed during the charge of the capacitor bank 186 in the skimming device 180. This is a savings of 58.56 gallons compared to charging the battery bank 140 via the AFE 160.

Figure 6:
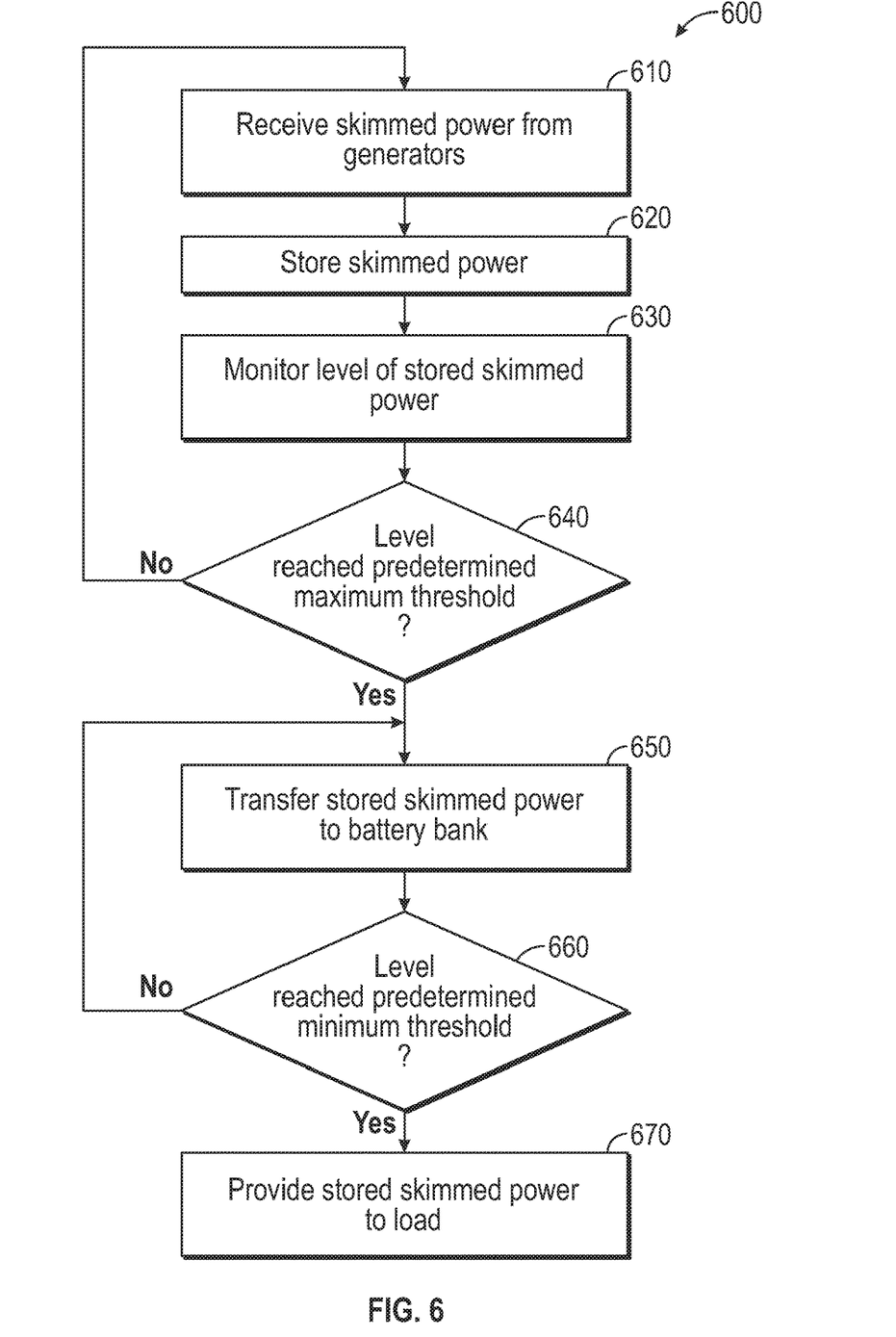
FIG. 6 is a flowchart depicting a method for storing skimmed power and providing skimmed power according to one or more examples of the present disclosure.

FIG. 6 is a flowchart depicting a method 600 for storing skimmed power and providing skimmed power according to one or more examples of the present disclosure. The method may be used by various components of the systems 100A and 100B shown in FIGS. 1A-2B, e.g., the controller 160, in conjunction with the skimming device 150, the battery bank 140, the DCAP 155, the switches 162 and 164, and the AFE 170 to store and provide skimmed power to the loads 120.

Referring to FIG. 6, the method 600 includes receiving, by a skimming device, skimmed power from the generators at 610. At 620, the skimmed power is stored by the skimming device.

At 630, a level of the skimming device is monitored by a controller. A determination is made by the controller at 640 whether the voltage level of the stored skimmed power has reached a predetermined maximum threshold, e.g., 50 Volts with a constant amperage. If not, the method returns to 610, and the skimmed power to continues to be received. If the level of the stored skimmed power has reached the predetermined maximum threshold, the stored skimmed power is transferred from the skimming device to a battery bank at 650.

At 660, a determination is made by the controller whether the level of the stored skimmed power has reached a predetermined minimum threshold, e.g., 5 Volts with a constant amperage. If not, the method returns to 650, and the stored skimmed power continues to be transferred to a battery bank. If the level of the stored skimmed power has reached a predetermined minimum threshold, the stored skimmed power is made available to be provided to the loads at 670.

Figure 7:
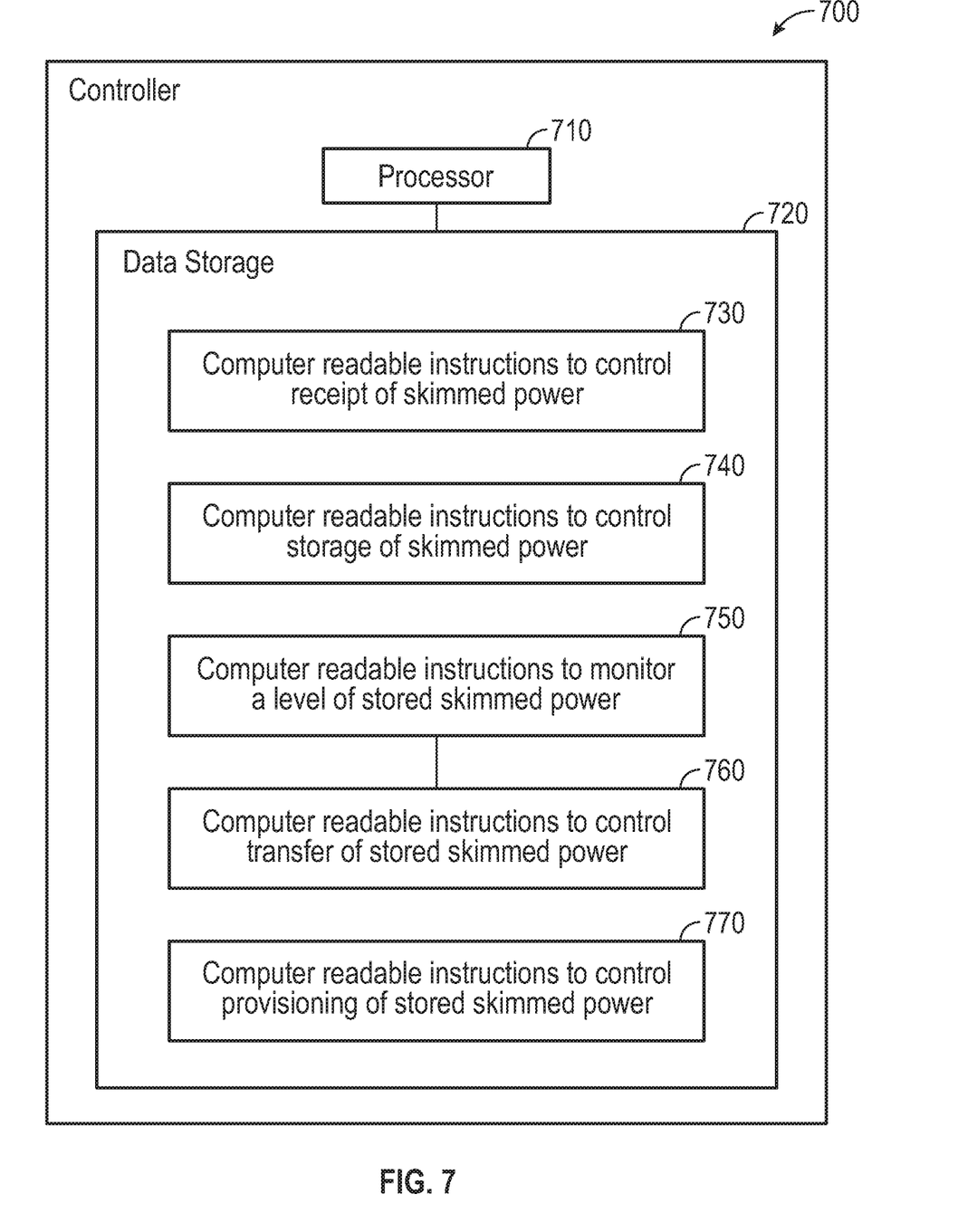
FIG. 7 illustrates a control device according to one or more examples of the present disclosure.

FIG. 7 illustrates a control device according to one or more examples of the present disclosure. The control device 700 may be used as the controller 170 shown in FIGS. 1A-2B. The control device 700 may include a processor 710 and a data storage 720. The processor 710 may include a microprocessor or any other type of processor. A similar control device may be used for the power management system 130 shown in FIGS. 1A-2B.

The data storage 720 may include, for example, a computer readable medium that is in communication with the processor 710, The data storage can be or include a hard drive, a virtual hard drive, a flash drive, or any other computer readable medium having stored thereon computer readable instructions that are executable by the processor 710.

For the control device 700 shown in FIG. 7, the computer readable instructions stored on the data storage 710 may include, for example, computer readable instructions 730 to control the receipt of skimmed power by the skimming device, computer readable instructions 740 to control storage of the skimmed power in the skimming device, computer readable instructions 750 to monitor a level of the stored power of the skimming device, computer readable instructions 760 to control transfer of the stored skimmed power to the battery bank, and computer readable instructions 770 to control provisioning of the stored skimmed power from the battery bank to the loads.

The foregoing description, for purposes of explanation, used specific nomenclature to provide a thorough understanding of the disclosure. However, it will be apparent to one skilled in the art that the specific details are not required in order to practice the devices, systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A system for charging vessel batteries using non-work producing reactive power, comprising:
    a plurality of generators to provide power to a plurality of vessel loads of the vessel;
    a bus;
    a skimming device coupled to the generators via the bus to receive and store skimmed non-work producing power from the plurality of generators;
    a battery bank coupled to the skimming device, the battery bank to receive the stored skimmed non-work producing power from the skimming device, store the skimmed non-work producing power, and provide the stored skimmed non-work producing power to the vessel loads; and
    a controller including a processor and a data storage having a plurality of computer instructions stored thereon, the processor to execute the plurality of computer instructions to:
        control operation of the skimming device, including receipt and storage of the skimmed non-work producing power by the skimming device;
        monitor a level of the stored skimmed non-work producing power in the skimming device; and
        control transfer of the stored skimmed non-work producing power from the skimming device to the battery bank and provisioning of the stored skimmed power from the battery bank to the vessel loads based on an instruction from a vessel power management system.

2. The system of claim 1, wherein the skimming device includes:
    a capacitor bank; and
    a Silicon Controlled Rectifier (SCR) to recirculate a reactive current that is non-work producing current through the alternating current (AC) generators and supply a reactive direct current (DC) current to the capacitor bank to store the skimmed non-work producing power in the capacitor bank.

3. The system of claim 1, wherein the skimming device is programmed to regulate a reactive load upon the generators.

4. The system of claim 1, further comprising a direct current (DC) to DC converter coupled between the skimming device and the battery bank to transfer the stored skimmer non-work producing power to the battery bank or the vessel loads.

5. The system of claim 1, wherein:
    the bus includes a direct current (DC) bus, and
    the system includes an active front end (AFE); and
    further comprising:
    a first switch coupled between the battery bank and the DC bus, and
    a second switch coupled between the skimming device and the AFE.

6. The system of claim 5, wherein when the first switch is closed and the second switch is open, the battery bank supplies the power stored in the battery bank to the vessel loads.

7. The system of claim 5, wherein when the first switch is open and the second switch is closed, the skimming devices transfers the stored skimmed non-work producing power to the battery bank.

8. The system of claim 5, wherein the controller is to cause the first switch to open and the second switch to close when the level of stored skimmed non-work producing power of the skimming device reaches a predetermined maximum threshold and is ready to transfer to the batteries.

9. The system of claim 8, wherein the controller is to cause the first switch to close and the second switch to open when the level of the stored skimmed non-work producing power of the skimming device reaches a predetermined minimum threshold.

10. The system of claim 1, wherein the skimming device is to receive the skimmed non-work producing power from the plurality of generators while the vessel is in transit.

11. The system of claim 1, wherein the skimming device is to provide the stored skimmed non-work producing power at any time.

12. A method for operating a vessel, comprising:
    receiving, by a skimming device, skimmed non-work producing power from at least one of a plurality of generators supplying power to a plurality of vessel loads;
    storing, by the skimming device, the skimmed non-work producing power in the skimming device;
    monitoring, by a controller, a level of the stored skimmed non-work producing power of the skimming device;
    transferring the stored skimmed non-work producing power from the skimming device to a battery bank;
    storing the skimmed non-work producing power received from the skimming device in the battery bank; and
    providing the stored skimmed power from the battery bank to the vessel loads, wherein transferring of the stored skimmed non-work producing power to the battery bank and providing the stored skimmed non-work producing power from the battery bank are performed based on the level of the stored skimmed non-work producing power in the skimming device.

13. The method of claim 12, wherein the skimmed non-work producing power stored in the skimming device is transferred from the skimming device to the battery bank responsive to the level of the skimmed non-work producing power stored in the skimming device reaching a predetermined maximum threshold level.

14. The method of claim 13, wherein the skimmed non-work producing power to be stored in the skimming device continues to be received by the skimming device responsive to the level of the stored skimmed non-work producing power not reaching the predetermined maximum threshold.

15. The method of claim 12, wherein the stored skimmed non-work producing power stored in the battery bank is provided from the battery bank to the vessel loads responsive to the level of power in the battery bank reaching a predetermined minimum threshold.

16. A control device for operating a vessel, comprising:
a processor; and
a data storage having computer readable instructions stored thereon which, when executed by the processor, to
control receipt of skimmed non-work producing power from at least one of a plurality of generators;
control storage of the skimmed non-work producing power in a skimming device;
monitor a level of the stored skimmed non-work producing power in the skimming device;
control transfer of the stored skimmed non-work producing power from the skimming device to a battery bank for storage in the battery bank; and
control provisioning of the stored skimmed non-work producing power from the battery bank to a plurality of vessel loads, wherein the transfer of the stored skimmed non-work producing power to the battery bank and the provisioning of the stored skimmed power from the battery bank are controlled based on the an instruction from a vessel power management system.

17. The control device of claim 16, wherein the control device causes the skimming device to transfer the stored skimmed non-work producing power to the battery bank responsive to the level of the stored skimmed power reaching a predetermined maximum threshold.

18. The control device of claim 17, wherein control device causes the skimming device to continue to receive the skimmed non-work producing power responsive to the level of the stored skimmed power not reaching the predetermined maximum threshold.

19. The method of claim 12, wherein the receipt of skimmed non-work producing power, by the skimming device, includes receipt of a majority of the reactive current.

20. The control device of claim 16, wherein to control receipt of skimmed non-work producing power from at least one of a plurality of generators includes to control receipt of skimmed non-work producing power using a programmed skimming device circulating reactive current from at least one of a plurality of generators.

* * * * *